(12) United States Patent
Kametaka et al.

(10) Patent No.: US 7,870,654 B2
(45) Date of Patent: Jan. 18, 2011

(54) MECHANICAL SEAL DEVICE

(75) Inventors: Koji Kametaka, Tokyo (JP); Kenji Kiryu, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 12/540,963

(22) Filed: Aug. 13, 2009

(65) Prior Publication Data

US 2009/0300900 A1 Dec. 10, 2009

Related U.S. Application Data

(63) Continuation of application No. 11/079,112, filed on Mar. 15, 2005, now abandoned.

(30) Foreign Application Priority Data

Mar. 19, 2004 (JP) .............................. 2004-079620

(51) Int. Cl.
*B23P 11/02* (2006.01)
(52) U.S. Cl. .................. 29/450; 29/451; 29/525.04; 29/888.3; 277/370; 277/372
(58) Field of Classification Search .................. 29/450, 29/451, 525, 525.04, 888.3; 277/370, 372, 277/373, 446
See application file for complete search history.

(56) References Cited

U.S. PATENT DOCUMENTS

| | | | |
|---|---|---|---|
| 2,113,167 A | 4/1938 | Baumheckel | |
| 2,489,781 A | 11/1949 | Isenbarger | |
| 2,823,057 A | 2/1958 | Mure | |
| 2,824,760 A | 2/1958 | Gits | |
| 3,689,083 A | 9/1972 | Greenawalt | |
| 3,764,148 A | 10/1973 | Mullaney | |
| 3,784,213 A | 1/1974 | Voitik | |
| 3,897,957 A | 8/1975 | Warner | |
| 4,213,618 A * | 7/1980 | Thurber | 277/373 |
| 4,304,408 A | 12/1981 | Greenawalt | |
| 4,449,721 A * | 5/1984 | Tsuge | 277/499 |
| 4,906,008 A * | 3/1990 | Warner | 277/370 |

* cited by examiner

*Primary Examiner*—David P Bryant
*Assistant Examiner*—Bayan Salone
(74) *Attorney, Agent, or Firm*—Arent Fox LLP

(57) ABSTRACT

A primary technical goal of a mechanical seal device of the present invention is to decrease assembly cost thereof as well as machining cost thereof and to prevent wear of seal surfaces by preventing occurrence of squealing noises of the seal surfaces. The mechanical seal device comprises a first seal ring which is one of a pair of seal rings and disposes an engagement portion at the outer circumferential surface, a retainer ring which has a first support portion supporting an inner diameter surface of the first seal ring and a second support portion engaging the engagement portion and is fixed with either a seal housing or a shaft, and a gasket which joins the retainer ring and the first seal ring in a sealing manner, wherein an engagement clearance (C) formed in a rotational direction between the engagement portion and the second support portion is within 0.5 mm.

6 Claims, 6 Drawing Sheets

MECHANICAL SEAL DEVICE

CROSS-REFERENCE TO RELATED APPLICATION

This non-provisional application is a continuation of and claims the benefit of U.S. patent application Ser. No. 11/079,112, filed Mar. 15, 2005, which claims priority to JP 2004-079620 filed Mar. 19, 2004. The disclosure of the prior applications is hereby incorporated herein in their entirety by reference.

BACKGROUND OF THE INVENTION

1. Field of the Invention

The present invention relates generally to a mechanical seal device which not only is economical in manufacture cost and assembly cost of parts thereof but also prevents squealing noises and wear of sliding surfaces thereof. More particularly, the invention relates to a mechanical seal device in which a certain arrangement of the assembly parts thereof materializes prevention of squealing and wear at the seal surface of a seal ring during relative sliding movement as well as improvement of durability of a gasket supporting the seal ring.

2. Description of the Related Art

A seal ring to provide a seal against a sealed fluid, in general, is made of a hard material such as silicon carbide in order to prevent wear of seal surface thereof. A gasket being made of a rubber-like elastic material is typically employed in order to effect a seal at the installation surface wherein the seal ring is retained as well as to provide a support for the seal ring. The support provided by the gaskets however, suffers from a torsional deformation to circumferential direction thereof which is caused by a rotary torque acted on the seal surface. Although the seal ring is fixed by means of a support portion of a retainer ring in order to circumvent the torsional deformation, engagement arrangement between the retainer ring and the seal ring becomes complicated because the seal ring needs to fixate engagement portion thereof with the retainer ring while simultaneously being fitted to the gasket. Such a complex arrangement in the engagement arrangement causes various difficulties against the gasket as well as the seal surface of the seal ring.

FIG. 4 displays a mechanical seal device 211 as a first prior art related to the present invention. The figure shows a half portion of a cross-sectional view of the mechanical seal device 211. In FIG. 4, a rotary seal ring 202 having a seal surface 202A is fitted at inner circumferential surface thereof with a cup gasket 204. The cup gasket 204 then is fitted with a mount portion 203D of a sleeve member 203. Outer circumferential surface of the rotary seal ring 202 disposes two or four equally spaced slot portions 202G, and each slot portion 202G forms an engagement flat surface 202T at the bottom of the slot. The mount portion 203D disposes a holding plate 203A which protrudes therefrom. The holding plate 203A is inserted into the slot portion 202G with a play against the side walls of the slot portion 202G. One rotary seal portion 201 in which the rotary seal ring 202 is fitted with the cup gasket 204 and the cup gasket 204 then is mounted onto the sleeve member 203 is arranged such that a fixing portion 203C of the rotary seal portion 201 can be fittingly fixed to a rotary shaft at inner diameter surface thereof.

Stationary seal ring 212, on the other hand, is fittingly fixed with a bellows member 214. Outer diameter portions of both distal end portions of the bellows member 214 fittingly mate with a first retainer portion 213A and a second retainer portion 213B, respectively, which effectively anchor the bellows member 214 at distal end portions thereof. A cartridge member 215 is fixed to a housing at one end thereof while other end thereof is fitted with the inner diameter surface of the stationary seal ring 212 in a slidable manner. In addition, a coil spring 219 is disposed between the first retainer portion 213A and the cartridge member 215. The spring 219 resiliently urges the stationary seal ring 212 against the rotary seal ring 202. This effects a seal against the sealed fluid by bringing an opposing seal surface 212A of the stationary seal ring 212 into seal-tight contact with the seal surface 202A of the rotary seal ring 202.

As illustrated in FIG. 4 and FIG. 5 including the aforementioned arrangement, a plurality of holding plates 203A which are disposed at the outer perimeter of the mount portions 203D are inserted into the respective slot portions 202G which are formed at the outer circumference of the rotary seal ring 202. It, however, is very difficult to make the width B of the holding plate 203A same as the width A of the mating slot portion 202G under current fabrication technologies due to presence of machining tolerance. Even if it is assumed that the width A and width B have exactly the same dimension, there remains another problem in that it is almost impossible to exactly align the locations of a plurality of holding plates 203A with those of the corresponding slot portions 202G which are spaced apart along the circumference. Therefore the width B of the holding plate 203A needs to be made smaller than the width A of the slot portion 202G so that the holding plate 203A leaves a gap to sides thereof for an easy installation. With such an arrangement, the holding plates 203A can be fitted to respective slot portions 202G. Furthermore, the rotary seal ring 202 is fixedly retained by the cup gasket 204 which is elastically deformable. When the seal surface 202A of the rotary seal ring 202 is subjected to a sliding movement relative to the opposing seal surface 212A of the stationary seal ring 212, a frictional force during the sliding movement generates a torque which will in turn induce a reciprocal torsion to the cup gasket 204 which connects the sleeve member 203 and the rotary seal ring 202 because of the clearance between the holding plate 203A and the slot portion 202G. This forces the seal surface 202A to repeat a stick-and-slip motion during the operation, which causes squealing noises at the relatively sliding seal surfaces 202A, 212A. To make things worse, the squealing and abnormal slip motion will lead to a rapid wear of the relatively sliding seal surfaces 202A, 212A and the cup gasket 204 will not last long as expected due to the reciprocal torque load. As a result, the mechanical seal device 211 will lose seal ability and durability thereof.

There is another mechanical seal device 111 shown in FIG. 6 as a second prior art relative to the present invention. Gross arrangement of the mechanical seal device 111 is more or less similar to that in FIG. 4, hence not shown. The overall arrangement will be described according to FIG. 6 and FIG. 5. What makes the mechanical seal device 111 in FIG. 6 different from the mechanical seal device 211 in FIG. 5 resides in a seal ring 102 and a sleeve's mount portion 103D, which will be explained in detail by using FIG. 6. As shown in FIG. 6, the rotary seal ring 102 forms a pair of engagement flat surfaces 102B, 102B at two symmetrical locations, top and bottom, of the outer perimeter surface. And the inner circumferential surface of the rotary seal ring 102 is fitted to the outer diameter surface of an annular cup gasket 104. The cup gasket 104 serves as a joint member to fittingly fixate the rotary seal ring 102 to an annular mount portion 103D of the sleeve. FIG. 6 also shows that the mount portion 103D retains a pair of flat holding plates 103A, 103A formed on the outer perimeter of the sleeve. The holding plates 103A, 103A are arranged in such a manner that the plates are kept in close contact state with the engagement flat surfaces 102B, 102B of the seal ring 102.

Arrangement of opposing members relative to the rotary seal ring 102 is omitted in FIG. 6, thus referring to FIG. 4. Disposed in opposite to the rotary seal ring 102, as shown in FIG. 4, is a stationary seal ring 212. The stationary seal ring 212 comes into contact with a bellows member 214 which is disposed between the stationary seal ring 212 and a cartridge member 215 which is connected with the housing. One end portion of the bellows member 214 is urged by a spring 219. An opposing seal surface 212A of the stationary seal ring 212 which is thus urged by the spring 219 via the one end portion of the bellows member 214 is brought into seal-tight contact with the seal surface 102A of the rotary seal ring 102 shown in FIG. 6.

The way the device in FIG. 4 and FIG. 6 operates is hereafter similar to one another. Therefore problems encountered in FIG. 6 will be dealt with by referring to FIG. 4. It is noted that parenthesized numerals correspond to those of FIG. 6. The mechanical seal device 211 (111) effects a seal against a sealed fluid within the apparatus by bringing the opposing seal surface 212A of the stationary seal ring 212 into seal-tight contact with the seal surface 202A of the rotary seal ring 202(102) as the result of the stationary seal ring 212 being urged by the spring 219 via the bellows member 214. The sleeve member 203 is fittingly fixed with the rotary shaft in order to rotate together. Then the rotary seal ring 202(102) which is mounted to the mount portion 203D(103D) via the cup gasket 214(104) is forced to rotate together with the rotary shaft after the engagement flat surface (102B) engages the holding plate (103A). However, bringing the engagement flat surface (102B) into seal-tight contact with the holding plate (103A) is very difficult to achieve from the machining point of view, because it requires that the cup gasket 214(104) be fitted not only with the mount portion 203D(103D) but also with the rotary seal ring 202(102). Also the holding plate (103A) needs to be directly worked to obtain the annular mount portion 203D(103D) by a press forming method, which will inevitably restrict machining accuracy. In addition, pressing the holding plate (103A) too much against the engagement flat surface (102B) causes unwanted strains to the seal surface 202A.

As shown in FIG. 6, pressing a pair of the symmetrically arranged engagement flat surfaces (102B) of the rotary seal ring (102) causes deformation of the seal surface 202A. Therefore a certain clearance is disposed between the engagement flat surface (102B) and the holding plate (103A). The seal surface 202A and the opposing seal surface 212A repeat a sticking and a relative sliding motion one after the other because of elastic torsional deformation of the cup gasket 204(104) in the circumferential direction and the clearance gap existing between the width dimension B of the engagement flat surface 102B and the width dimension A of the holding plate 103A. The repeated sticking and relative sliding motion causes a squealing noise. The sticking further accelerates wear in the seal surface 202A. As the result, the seal ability of the mechanical seal device 211(111) will decrease.

The present invention is introduced to resolve the above mentioned problems. A primary technical goal which this invention tries to achieve is to make part machining and assembly of a mechanical seal device straightforward and to improve durability of a gasket supporting a seal ring by protecting the gasket from torsional fatigue. Another goal is to prevent squealing noises of a seal surface during sliding movement thereof and to reduce wear of the seal surface.

BRIEF SUMMARY OF THE INVENTION

A primary object of the present invention is to resolve the above mentioned technical problems, and a solution to such problems is embodied as follows.

A mechanical seal device related to the present invention is a mechanical seal device providing a seal between a bore disposed in a seal housing and a shaft extending through the bore by means of a pair of seal rings. The mechanical seal device comprises a first seal ring, a retainer ring and a gasket wherein the first seal ring is one of a pair of the seal rings and disposes an engagement portion at the outer circumferential surface, wherein the retainer ring has a first support portion and a second support portion and is fixed with either the seal housing or the shaft, wherein the first support portion supports the first seal ring, wherein the second support portion engages the engagement portion to be locked in with each other in a rotational direction, wherein the gasket is made of a rubber-like elastic material and is disposed between the first support portion of the retainer ring and the first seal ring and joins the first support portion and the first seal ring, wherein the gasket is in a fixed contact relation with the first support portion and the first seal ring, wherein an engagement clearance formed in a rotational direction between an engagement end portion of the second support portion and an engagement wall of the engagement portion is within 0.5 mm.

In the mechanical seal device related to the present invention, the second support portion engages the engagement portion of the first seal ring to be locked in with each other in a rotational direction in which the first seal ring is fittingly fixed with the gasket, and the engagement clearance C between the two components is arranged to be within 0.5 mm. This enables the second support portion to constantly engage the engagement wall of the engagement slot of the seal ring during rotation. This engagement at the engagement wall allows the gasket to prevent wear of the seal surfaces due to torsional torques induced by relative sliding movement of the seal ring during the rotation. As a result, the gasket is able to improve durability thereof. This also implies that even if the seal ring is retained by a rubber-like elastic gasket, the seal surfaces remain free of stick-and-slip motion owing to the secure engagement between the engagement portion and the second support portion, thus preventing squealing noises of the seal surfaces under the sliding movement. Prevention of unwanted squealing noises will be resulted in a prevention of wear of the seal surfaces. This also will be able to avoid fatigue or damage of the second support portion and associated contact portion thereof due to collision contact therebetween.

DETAILED DESCRIPTION OF THE INVENTION

Figure 1:
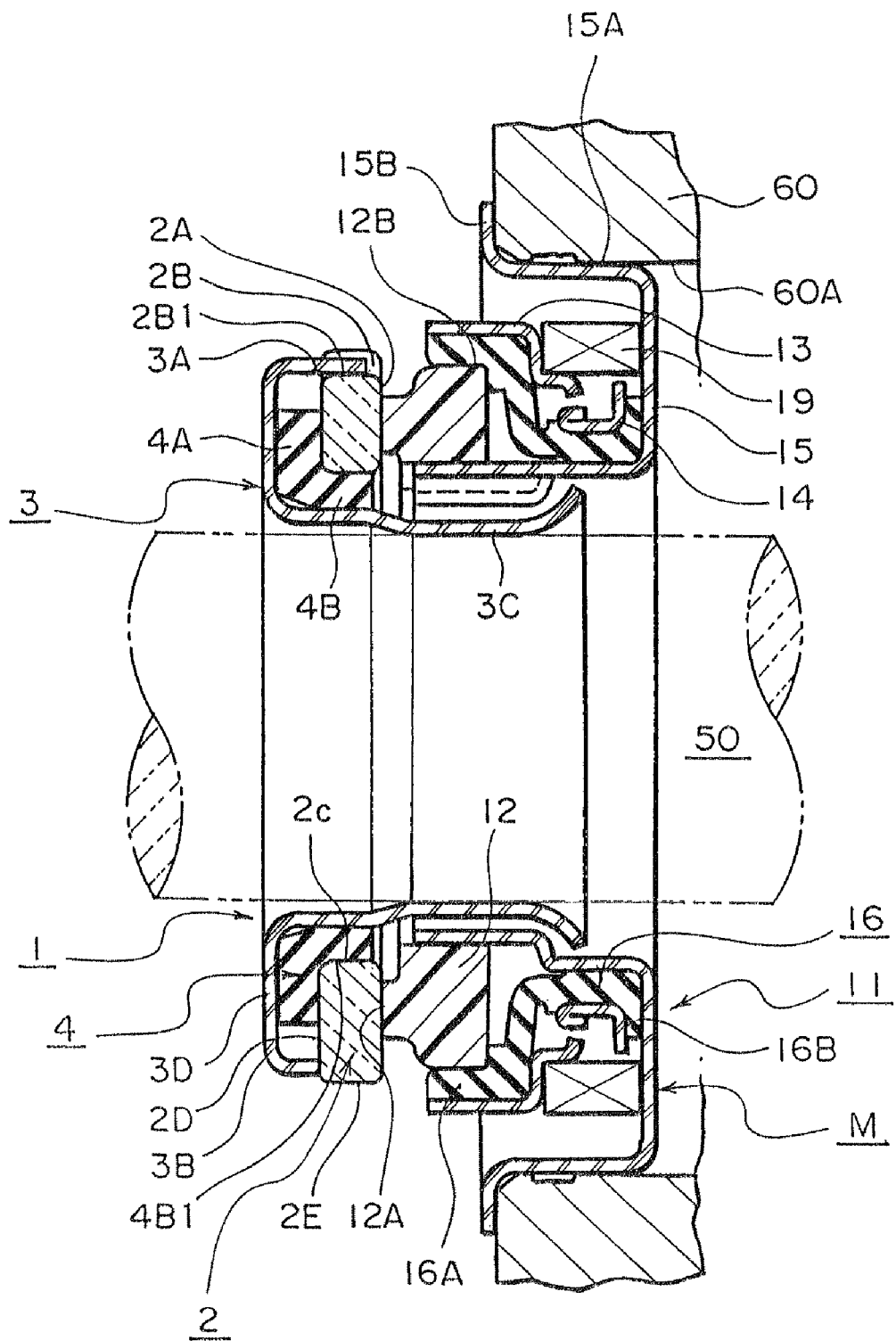
FIG. 1 is a cross sectional view of a mechanical seal device as a first embodiment related to the present invention.
Figure 2:
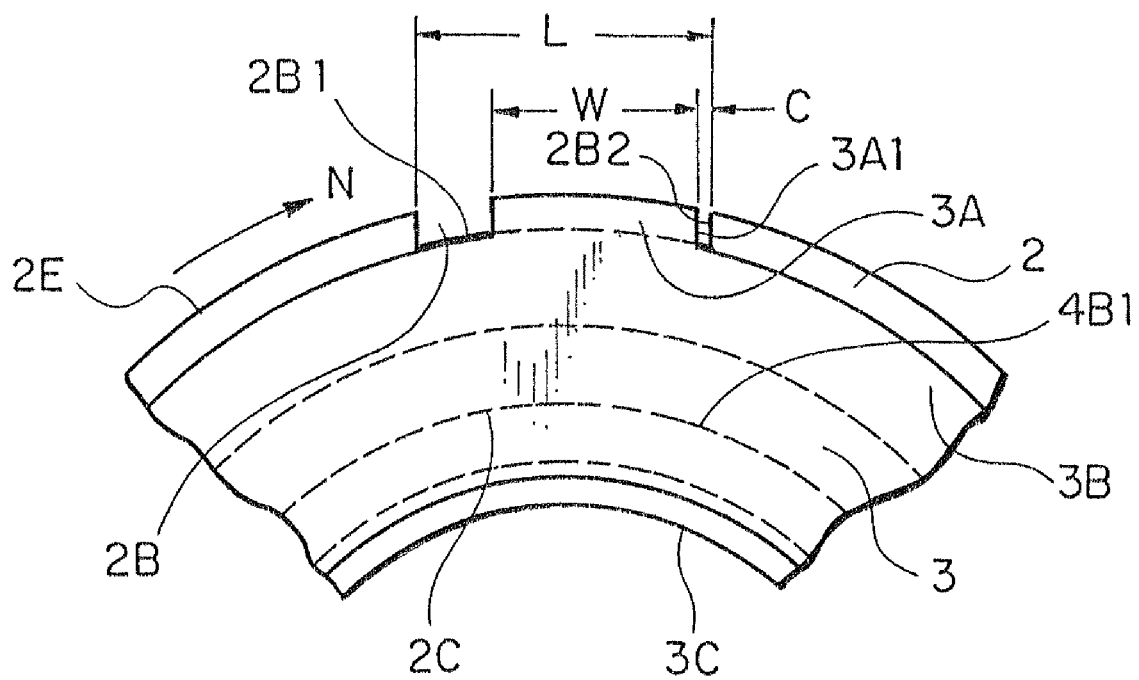
FIG. 2 is a front view of a portion of a retainer ring of a first seal section in FIG. 1.
Figure 3:
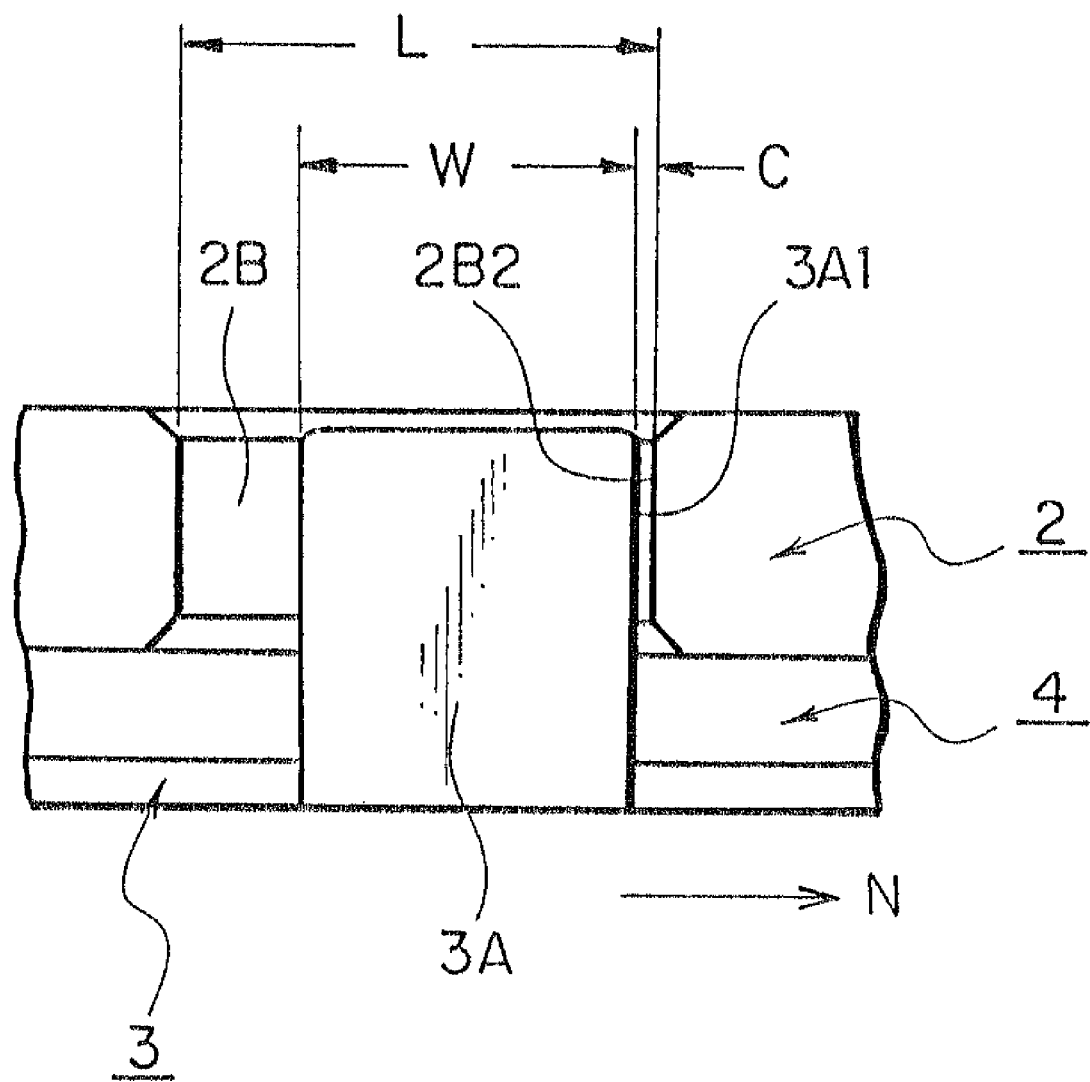
FIG. 3 is a plan view of FIG. 2.

Described below is the details of the figures of a preferred embodiment of a mechanical seal device constructed in accordance with the principles of the present invention. All the figures explained below are constructed according to actual design drawings with accurate dimensional relations. FIG. 1 depicts a cross sectional view of a mechanical seal device M representing a first embodiment relative to the present invention. FIG. 2 shows a front view of a portion of a first seal section 1 in FIG. 1. FIG. 3 then shows a plan view of the vicinity of a second support portion in FIG. 2.

FIG. 1, FIG. 2 and FIG. 3 will be referred to in descriptions below. The mechanical seal device M includes a pair of seal sections; a first seal section 1 (at one side) and a second seal section 11 (at the other side) which oppose against one the other. A seal surface 2A of a first seal ring (one seal ring) 2 disposed in the first seal section 1 and an opposing seal surface 12A of a second seal ring (the other seal ring) 12 in the second seal section 11 are brought into seal-tight contact with each other in order to effect a seal against a sealed fluid. An inner circumferential surface 2C and an end surface 2D of the first seal ring 2 are adhered to a gasket 4 which is made of an elastic resin material. The gasket 4 then is sealingly fitted with a retainer ring 3 in order to join the first seal ring 2 and the retainer ring 3 together. The second seal ring 12, on the other hand, is supported by a cartridge member 15 via a bellows member 14 and a spring 19.

In FIG. 1, FIG. 2 and FIG. 3, a first seal ring 2 which corresponds to the rotary seal ring has an annular form with a rectangular cross section. Front end surface of the first seal ring 2 defines a first seal surface 2A which is mirror-finished. Then the opposite side to the first seal surface 2A in the first seal ring 2 defines an end surface 2D. Also the inner perimeter of the first seal ring 2 forms an inner circumferential surface 2C. Further, as illustrated in FIG. 2 and FIG. 3, an outer circumferential surface 2E of the first seal ring 2 disposes three engagement portions 2B thereat which have a slot form and are equally spaced apart along the outer perimeter. Slot width L of the engagement portion 2B is arranged larger than the plate width W of the second support portion 3A. One of the side walls of the slot in the engagement portion (also called as engagement slot) 2B which is located in the forward direction of rotation is defined as an engagement wall 2B2. In general, there are a plurality of engagement portions 2B which are equally spaced apart along the circumference. In case that the engagement portion 2B pressed hard by the second support portion 3A may cause strains to the seal surface 2A, the engagement portions 2B are better arranged along the circumference in an anti-symmetrical manner. Bottom surface 2B1 can be arranged so as to form a circular arc, or a portion of the outer circumferential surface can be made to have a flat surface. It is noted that the first seal ring 2 is made of a low-friction hard material. Such low-friction hard materials include silicon carbide, ceramics, super hard alloy, carbon and so on.

Retainer ring 3 is a sleeve member being made from a stainless steel sheet, which has a cylindrical form as a whole. On end portion of the cylindrical form defines a fixing portion 3C which is fitted over the shaft 30. The other end portion relative to the fixing portion 3C defines a first support portion 3D. The first support portion 3D consists of a mount cylindrical portion and a flange portion which extends from the end portion of the mount cylindrical portion in a radial direction. And the outer circumferential edge of the flange portion continues to form a short outer ring 3B therefrom whose shape is either a circular arc or a cylinder. The outer ring 3B disposes three sets of second support portions 3A which are equally spaced apart along the circumferential surface. This second support portion 3A (also called cantilever beam), as shown in FIG. 2 and FIG. 3, is arranged to have a form of a rectangular cantilever beam which extends from the outer ring 3B in an axial direction. Longitudinal length of the second support portion 3A should preferably be more or less the same as that of the seal surface 2A of the first seal ring 2.

Also the beam width W of the cantilever beam 3A should be smaller than the slot width L of the engagement portion 2B. This is because a plurality of engagement portions 2B as well as a plurality of second support portions 3A (for example, 3, 4 or 5 sets) are disposed along the circumference and it becomes extremely difficult to align all the second support portions 3A with the mating engagement portions 2B if the beam width W of the second support portion 3 were the same as the slot width L of the engagement portion 2B. In general, the more slots and beams along the circumference, the more difficulties in fitting the two mating components with each other. In practice, if the slot width L and the beam width W are arranged to have an identical dimension and are subjected to a highly precise fit, the individual contact surfaces of both members need to be finished by lapping or the like. Therefore completing even one pair takes a lot of time and this will lead to a substantial increase in manufacture cost and assembly cost, which will eventually push it out of reach from the standpoint of industrial interests. The second support portion 3A has an engagement end portion 3A1 at side wall thereof in the direction of rotation which engages an engagement wall 2B2 of the engagement portion 2B. Furthermore, the second support portion 3A should preferably be reinforced by forming a rugged or wavy profile on the surface and also dispose an engagement end portion 3A1 which comes into contact with the engagement wall 2B2 of the engagement portion 2B.

The engagement portion 2B of the first seal ring 2 and the second support portion 3A are assembled as shown in FIG. 2 and FIG. 3. Direction of rotation of the first seal portion 1 in FIG. 2 and FIG. 3 is represented by N. Assembly of the engagement portion 2B and the second support portion 3A is arranged such that the engagement wall 2B2 of the engagement portion 2B and the engagement end portion 3A1 of the second support portion 3A form an engagement clearance therebetween to the direction of rotation N which is less than 0.5 mm. The engagement clearance C should preferably be less than 0.1 mm. Assembly of the respective second support portions 3A and engagement portions 2B under an engagement clearance C of less than 0.1 mm is feasible from the manufacture standpoint because the engagement clearance C is disposed at only one side of the two side walls of the second support portions 3A. This way of assembling the engagement wall 2B2 of the engagement portion 2B makes it straightforward to keep the engagement clearance C within 0.5 mm even under the presence of spring-back of the gasket 4. Also a dimensional relationship between the slot width L and the beam width W should be determined by considering the strength of the beam width W due to a rotational torque of the first seal ring 2. Then the slot width L should be chosen such that the second support portion 3A can easily be mated with the engagement portion 2B in the assembly process of the first seal ring 2 and the retainer ring 3. This will substantially decrease a manufacture cost of the engagement portion 2B and the second support portion 3A.

The second support portion 3A should be set in a non-contact state relative to the bottom surface 2B1 of the engagement portion 2B for the ease of assembly. In case that there is a need to bring the second support portion 3A into a contact state with the bottom surface 2B1 of the engagement portion 2B, a dimensional interference should be in a range of from 0 to 0.30 mm. More preferably, the interference should be in a range of from 0.01 mm to 0.25 mm. That is, the interference of the second support portion 3A is formed radially inward relative to the radius of the engagement portion 2B. This level of interference of the second support portion 3A does not cause serious strains to the seal surface. The free end portion of the second support portion 3A may be bent radially outward so that the first seal ring 2 can easily be inserted to the second support portion 3A. Material for the retainer ring 3 should be determined according to the characteristics of the sealed fluid, e.g., stainless steel, aluminum, copper, steel plate or the like.

The cup gasket 4 comes into sealing contact with a cylindrical mount portion as well as with a flange portion of the first support portion 3D in the retainer ring 3, The cup gasket 4 fixedly joins the first seal ring 2 with the first support portion 3D of the retainer ring 3 by forming sealing contact with the inner diameter surface 2C as well as the end surface 2D of the first seal ring 2. The gasket 4 consists of a flange support portion 4A and a fit portion 4B the latter of which has a cylinder form axially extending from the inner diameter portion of the support portion 4. The inner diameter surface of the fit portion 4B in the gasket 4 comes in fitting contact with the first support portion 3D while the outer diameter surface of the fit portion 4B is brought into sealing contact with the inner diameter surface 2C of the first seal ring 2. The fit portion 4B and the first seal ring 2 are fittingly connected with each other so that they rotate together in an integral manner. Also the support portion 4A provides the first seal ring 2 with a resilient support in the axial direction. Therefore, the gasket 4 not only is able to effect a seal against a sealed fluid in order to prevent the fluid from leaking from between the retainer ring 3 and the first seal ring 2, but also resiliently urges the first seal ring 2 against the retainer ring 3. This gasket 4 is made of a rubber material, preferably FKM, NBR, IIR, U, Q, CR or the like.

A second seal ring 12 which opposes to the first seal ring 2 is supported by a cartridge member 15 in a freely slidable manner which is made of stainless steel plate. A rubber made bellows member 16 is disposed between the second seal ring 12 and the cartridge member 15. A first mount ring 13 is fitted with the one end portion of the bellows member 16 such that a spring 19 can exert an urging force thereto. Thus the bellows member 16 and the spring 19 resiliently urge the second seal ring 12 against the first seal ring 2. The first mount ring 13 securely holding the outer circumference surface of the bellows member 16 causes the inner diameter surface to be fixed to the outer diameter surface of the second seal ring 12. Also the other end of the bellows member 16 is securely fixed to the cartridge member 15 by means of a second mount ring 14. The cartridge member 15 comes into fit contact at a fixing portion 15A with a bore section of a seal housing member 60 and is fixedly settled by bringing a flange portion 15B into contact with the end surface of the seal housing member 60. The second seal ring 12 is also made of one of low-friction hard materials which are in general preferably used. Such hard materials include silicon carbide, carbon, super hard alloy and so on.

A mechanical seal device of a second embodiment related to the present invention is not shown here. What makes the current mechanical seal device different from the mechanical seal device 1 of FIG. 1 is in a second support portion 3A of a retainer ring 3 which is disposed in a first seal portion 1. The second support portion 3A which is represented by the same reference numeral as that in FIG. 1 forms an outer ring 3B which cylindrically extends from the outer circumferential end of the first support portion 3D. A plurality of second support portions 3A are formed by slitting at the outer ring 3B in a equally spaced manner such that the width W of the beam becomes smaller than the slot width L of the engagement portion 2B. Then the second support portion 3A which has a form of cantilever beam can be slightly bent radially inward such that an interference between the bottom surface 2B1 of the engagement portion 2B and the mating contact surface of the second support portion 3A becomes about 0.15 mm. This interference should be in a range of from 0 to 0.30 mm. More preferably, the interference H of the second support portion 3A relative to the engagement portion 2B should be in a range of from 0.01 mm to 0.25 mm. Manufacturing the second support portion 3A from the outer ring 3 in this manner allows a fine adjustment of the length of the second support portion 3A by means of controlling the slitting depth in the axial direction. Therefore, spring-back of the second support portion 3A urging the engagement portion 2B can be held small, thus improving strength of the second support portion 3A.

Figure 4:
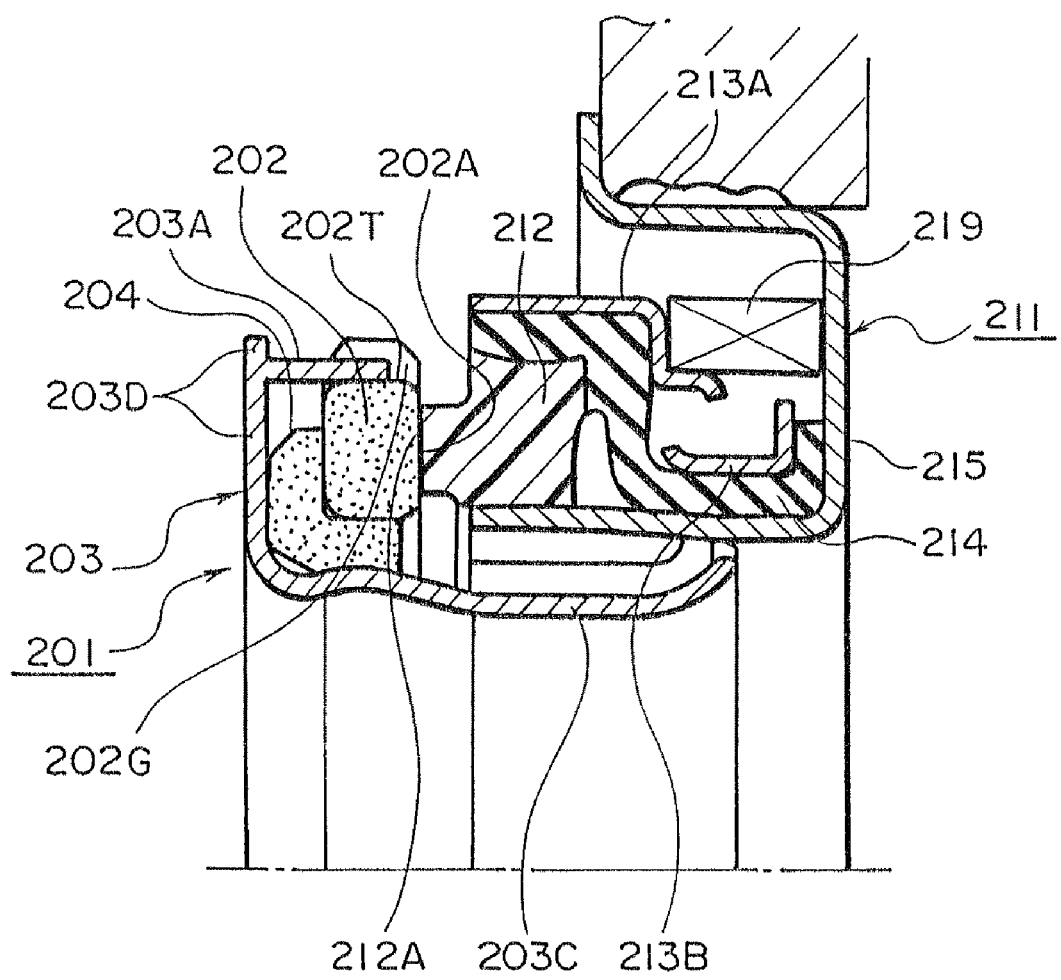
FIG. 4 is a half cut-away sectional view of a mechanical seal device as a relative art of the present invention.
Figure 5:
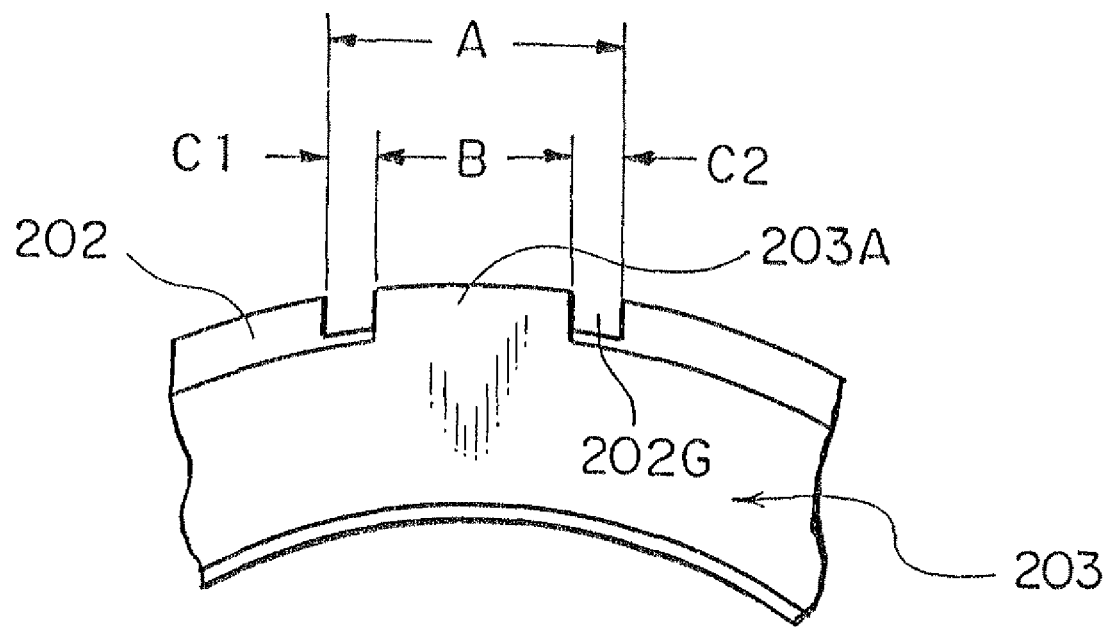
FIG. 5 is a front view of a portion of the mechanical seal device in FIG. 4.
Figure 6:
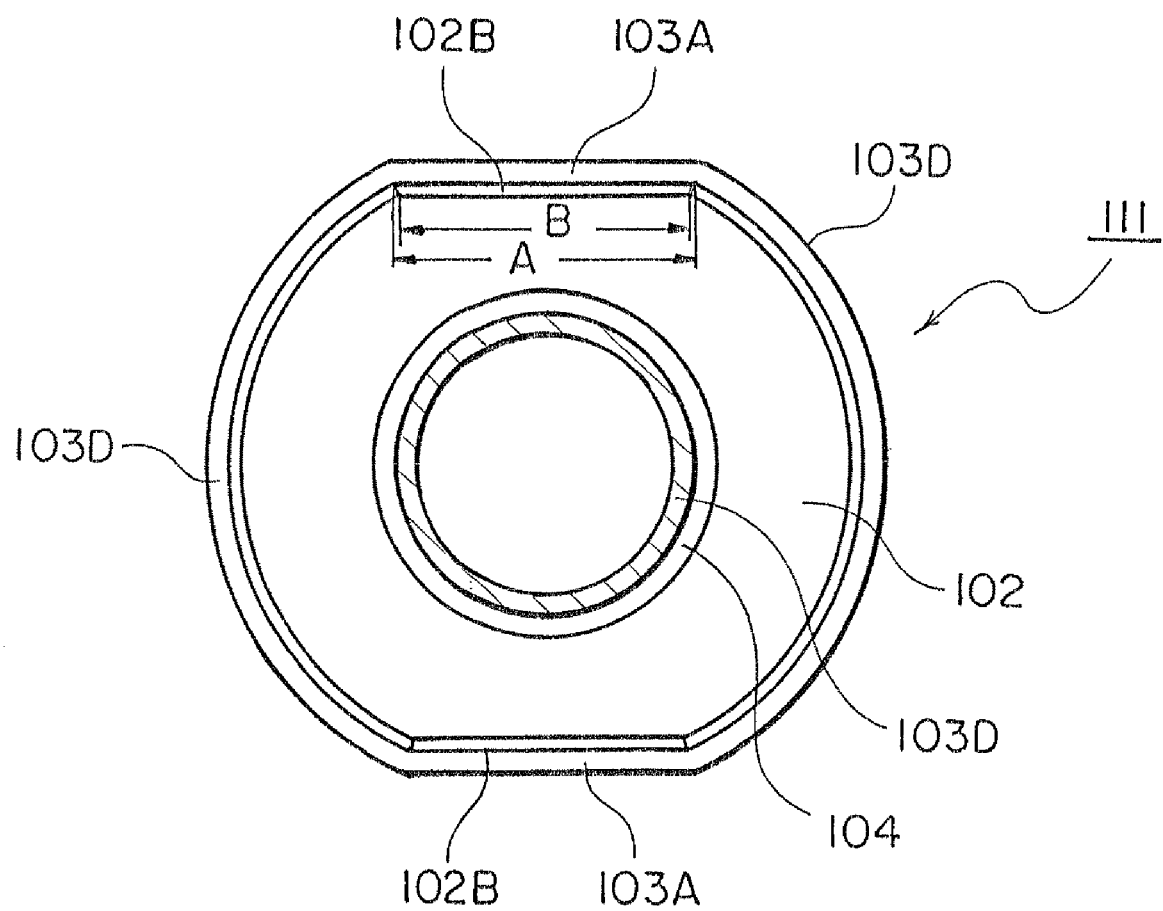
FIG. 6 is a cross sectional view of a mechanical seal device viewed from a seal surface as another relative art of the present invention.

Testing results of a mechanical seal device M of the present invention shown in FIG. 1 and a mechanical seal device 211 as a comparison example shown in FIG. 4 and FIG. 5 are given below wherein squealing noises during relative sliding motion of the seal surfaces are evaluated.

A. Testing Machine
  1) Drilling machine type mechanical seal unit testing machine (commercially available testing apparatus in which a mechanical seal device is installed in a liquid tank and a fluid leaking from the seal surfaces is subject to measurement after the fluid is sunk to the bottom.)

B. Test Conditions
  1) Rotational speed of the seal rings is 0 to 2000 rpm, being varied therebetween.
  2) Liquid temperatures of the sealed fluid adopted are 40, 60, 80 and 100 degrees in Celsius.
  3) Sealed fluid pressure used is an atmospheric pressure.
  4) Type of sealed fluid used is 50% water solution of LLC (Long Life Coolant).
  5) Slot width L of an engagement portion 2B is 5.5 mm.
  6) Beam width W of a second support portion 3A is 4 mm.
  7) Engagement clearance C is 0.5 mm.

C. Testing Results
  1) Mechanical seal device M of the present invention
     Occurrence of squealing noise with the present invention is 3% to 10% (note: noise was observed in the vicinity of 60 degree in Celsius and less than 500 rpm).
  2) Mechanical seal device 211 of the comparison example
     Occurrence of squealing noise with the comparison example is 25% to 35%.
  3) The above results clearly indicate that the mechanical seal device of the present invention gives much less chance of squealing noise than the comparison example.

Next, how to assemble the first seal portion 1 in FIG. 1 will be explained below. First, the engagement portion 2B and second support portion 3A of the first seal portion 1 are assembled as shown in FIG. 2 and FIG. 3. A rubber made cup gasket 4 is inserted to the first support portion 3D of the retainer ring 3 from the distal end portion 3C in an expanded form in order to bring the gasket 4 into fitting contact with the first support portion 3D. Press fitting forces a fit surface 4B1 of a fitting portion 4B of the gasket 4 to fit with the inner diameter surface 2C of the first seal ring 2. Alternatively the gasket 4 can engage the inner diameter surface 2C of the first seal ring 2 whose surface has a rugged or wavy profile. Engagement clearance C formed between the engagement end portion 3A1 of the second support portion 3A and the engagement wall 2B2 of the engagement portion 2B should be less than 0.5 mm after pres fitting of the fit surface 4B1 of a fitting portion 4B of the gasket 4 to the inner diameter surface 2C of the first seal ring 2. The radially inner surface of the second support portion 3A1 is kept in a non-contact state relative to the bottom surface 2B1 of the engagement portion 2B. If a contact engagement of the second support portion 3A1 against the bottom surface 2B1 of the engagement portion 2B is preferred, then the interference of the second support portion 3A1 should be chosen in a range of from 0 mm to 0.30 mm. It is also confirmed that a squealing noise is hardly observed during relative sliding movement of the seal surfaces if the engagement clearance C between the engagement end portion 3A1 of the second support portion 3A and the engagement wall 2B2 of the engagement portion 2B in the first seal ring 2 is kept in less than 0.5 mm after the completion of assembly, and the opposite clearance is more than 1.0 mm.

Next, preferred exemplary embodiments of the other inventions related to the present invention are described below.

In a mechanical seal device M as a second exemplary embodiment related to the present invention, an engagement portion 2B is defined by an engagement slot which extends in an axial direction and a second support portion 3A is defined by a cantilever beam which is inserted into the engagement slot.

According to the mechanical seal device M of the second exemplary embodiment, since the second support portion 3A axially extends from a first support portion 3D so as to form a cantilever beam and the cantilever beam is inserted into the engagement slot (engagement portion 2B), it becomes straightforward to deploy an engagement if an engagement clearance C between an engagement end portion 3A1 of the cantilever beam and an engagement wall 2B2 of the engagement portion 2B is arranged to be within 0.5 mm. In particular, a straightforward insertion of the cantilever beam into the engagement slot implies am easy machining of the cantilever beam and engagement slot, thus resulting in a decrease in the machining cost. This also contributes to not only prevention against squealing noises of the respective seal surfaces 2A, 12A but also prevention against wear associated with the squealing noises. This ensures a prolonged seal ability of the mechanical seal device M.

In a mechanical seal device M as a third exemplary embodiment related to the present invention, a dimensional interference chosen for the inner circumferential surface of a second support portion 3A against the bottom surface 2B1 of an engagement portion (engagement slot) 2B is in a range of from 0 to 0.25 mm.

According to the mechanical seal device M of the third exemplary embodiment, the bottom surface 2B1 of the engagement portion 2B and the opposing mating surface of the second support portion 3A are subjected to an interference fit with an interference of 0 to 0.25 mm. When the dimensional interference which determines the contact pressure between the second support portion 3A and the engagement portion 2B is arranged in a range of from 0.01 mm to 0.25 mm, undesirable surface strains which deteriorate seal ability are hardly observed at the seal surface 2A of the first seal ring 2. Therefore, a certain dimensional error can be tolerated for the interference C which is formed between a plurality of engagement portions 2B and a plurality of second support portions 3A on the circumferential surface of the first seal ring 2 while a secure engagement between the first seal ring 2 and the second support portion 3A is being maintained. Further, the second support portion 3A is kept in contact with the engagement portion 2B even when the mechanical seal device M is subjected to external vibratory forces, and a defective engagement of the second support portion 3A against the engagement portion 2B caused by oscillation of the second support portion 3A during rotation can also be prevented. Such a secure engagement between the second support portion 3A and the engagement portion 2B will effectively prevent occurrence of squealing noises as well.

In a mechanical seal device M as a fourth exemplary embodiment related to the present invention, a plurality of pairs consisting of engagement portions (engagement slots) 2B of a first seal ring 2 and second support portions 3A of a retainer ring 3 are arranged on the circumferential surface under an engagement relation with one the other, and the respective second support portions 3A are arranged in a non-contact state against corresponding bottom surfaces 2B1 of the engagement portions 2B.

According to the mechanical seal device M of the fourth exemplary embodiment, a plurality of the engagement portions 2B of the first seal ring 2 and a plurality of the second support portions 3A of the retainer ring 3 are arranged in pairs along the circumferential surface and the respective bottom surfaces 2B1 of the engagement portions 2B remain in a non-contact state against the second support portions 3A. This makes assembly of the second support portions 3A and engagement portions 2B straightforward and several second support portions 3A (four to six units) can be engaged with several engagement portions 2B (also four to six units) of the first seal ring 2. And durability of the seal device will improve in accordance with the increased strength provided by the secure engagement between the second support portions 3A and the first seal ring 2. Such a strong engagement of the second support portions 3A with the first seal ring 2 will lead not only to an outstanding seal ability of the respective seal surfaces 2A, 12A but also to prevention against squealing noises during relative sliding movement. This also will prevent wear of the respective seal surfaces 2A, 12A accordingly.

In a mechanical seal device M as a fifth exemplary embodiment related to the present invention, second support portions 3A are formed in an outer ring 3 which fits a first seal ring 2, and the cantilever beams which are machined by slitting the outer ring 3 in the axial direction are bent toward a radially inward direction of engagement portions 2B.

According to the mechanical seal device M of the fifth exemplary embodiment, the second support portions 3A are defined as cantilever beams wherein the cantilever beams are formed by slitting the cylindrical outer ring 3 in the axial direction surrounding the first seal ring 2 and are bent toward a radially inward direction of engagement portions 2B. This arrangement enables the cantilever beams not only to increase strength thereof along the rotational direction owing to retaining by the outer ring 3 but also to engage the engagement portions 2B in a more secure manner. Also the integral construction of the cantilever beams and the outer ring 3 prevents a spring-back of the beams and allows a specified interference to exhibit a necessary retaining force against the engagement portions 2B. This in turn not only prevents occurrence of squealing noises at respective seal surfaces 2A, 12A during relative sliding movement but also decreases wear of the seal surfaces 2A, 12A.

Mechanical seal device of the present invention is effective for sealing against a sealed fluid in pumps of radiator, cooler, compressor or the like which are typically used in automobiles or construction machinery. In particular, the seal device enjoys a high seal ability, almost no squealing noise admitted during the rotation, and a high protection against wear of the seal surfaces.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments, The technical scope of the invention is specified by the claims.

What is claimed is:

1. A method for assembling a mechanical seal device for providing a seal between a bore disposed in a seal housing and a shaft extending through said bore, said mechanical seal device comprising:
    a pair of seal rings including a first seal ring having an engagement portion at an outer circumferential surface thereof;
    a retainer ring having a first support portion and a second support portion and being fixed with said shaft, said first support portion supporting said first seal ring, said second support portion engaging said engagement portion disposed at the outer circumferential surface of said first seal ring to be locked with each other in a rotational direction; and
    a gasket made of an elastic material and disposed between said first support portion of said retainer ring and said first seal ring, wherein only said gasket is disposed between said retainer ring and said first seal ring and said gasket joins said first support portion and said first seal ring, said gasket being in a fixed contact relation with said first support portion and said first seal ring, said method comprising the steps of:
    attaching said gasket to the first support portion of the retainer ring from a fixing portion in order to bring the gasket into fitting contact with the first support portion; and
    engaging said first seal ring to said retainer ring by press fitting a inner diameter surface of said first seal ring into a fit surface of a fitting portion of said gasket 4, in a condition where said second support portion of said retainer ring is engaged to said engagement portion of said first seal ring, an engagement clearance (C) formed in a rotational direction between an engagement end portion of said second support portion and an engagement wall of said engagement portion is within 0.5 mm, and an opposite clearance formed in an opposite direction of the rotational direction between said second support portion and said engagement portion is larger than said engagement clearance (C).

2. A method for assembling a mechanical seal device as claimed in claim 1 wherein said opposite clearance formed in the opposite direction of the rotational direction is more than 1.0 mm.

3. A method for assembling a mechanical seal device as claimed in claim 1 wherein said engagement portion is arranged to be an axially extending engagement slot, said second support portion are arranged to be a cantilever beam, and said second support portion is inserted into said engagement portion in the step of engaging said first seal ring to said retainer ring.

4. A method for assembling a mechanical seal device as claimed in claim 3 wherein said cantilever beam are disposed in an outer ring portion of said retainer ring and formed by slitting said outer ring portion of said retainer ring in the axial direction and bending said slit outer ring portion towards said engagement portions.

5. A method for assembling a mechanical seal device as claimed in claim 1 wherein a bottom surface of said engagement portion is in contact with an inner circumferential surface of said second support portion with a dimensional interference between said second support portion and said bottom surface, wherein said dimensional interference is in a range of from 0 to 0.25 mm.

6. A method for assembling a mechanical seal device as claimed in claim 1 wherein a plurality of said engagement portions of said first seal ring engage a plurality of said second support portion of said retainer ring along the circumferential surface, wherein said second support portion and said bottom surface of said engagement portion are arranged in non-contact state with each other.

* * * * *